United States Patent [19]

Dounce

[11] 4,011,561
[45] Mar. 8, 1977

[54] SIMPLIFIED DIGITAL CONVERSION FOR COHERENT-ON-RECEIVE PULSED RADAR SYSTEM

[75] Inventor: Eric Alexander Dounce, Glendale, Ariz.

[73] Assignee: Motorola, Inc., Chicago, Ill.

[22] Filed: July 7, 1975

[21] Appl. No.: 594,135

[52] U.S. Cl. .............................. 343/5 DP; 343/7.7; 343/17.1 R

[51] Int. Cl.² ........................................ G01S 9/05

[58] Field of Search ............... 343/5 DP, 7.7, 17.1

[56] References Cited

UNITED STATES PATENTS

| | | | |
|---|---|---|---|
| 3,372,389 | 3/1968 | Bellman et al. | 343/7.7 |
| 3,631,489 | 12/1971 | Cooper | 343/7.7 |
| 3,680,099 | 7/1972 | Herman et al. | 343/7.7 |
| 3,742,500 | 6/1973 | Freedman | 343/7.7 |
| 3,745,571 | 7/1973 | Chwastyk et al. | 343/7.7 |
| 3,877,011 | 4/1975 | Holberg et al. | 343/7.7 |

Primary Examiner—Maynard R. Wilbur
Assistant Examiner—S. C. Buczinski
Attorney, Agent, or Firm—M. David Shapiro

[57] ABSTRACT

An improvement in a pulsed radar system providing coherent-on-receive signals utilizing digital techniques. The phase of the transmitted signal is compared to the phase of a stable local oscillator and the phase relationship is converted to a complex digial number which is then stored in a suitable short term memory. The received signals are also converted to complex digital numbers containing both the phase relationship to the stable local oscillator and the amplitude of the return video signal. A common signal channel is used for conversion of both the transmitter pulse and the received signals. The digitized received signals are then digitally phase corrected to provide coherence using the stored complex digital numbers for the correction.

6 Claims, 3 Drawing Figures

SIMPLIFIED DIGITAL CONVERSION FOR COHERENT-ON-RECEIVE PULSED RADAR SYSTEM

FIELD OF THE INVENTION

This invention relates to the use of digital techniques to provide phase correction in a coherent-on-receive pulsed radar system.

BACKGROUND OF THE INVENTION

Coherent-on-receive techniques are successfully used to provide coherence in prior art pulsed radar systems. These systems use analog techniques for measuring and storing the phase relationship between the transmitted signal and a stable local oscillator and for similarly measuring the phase relationship between the received signals and the same stable local oscillator. The analog stored comparisons are then used to introduce a phase correcting factor to the received signals thereby producing coherent received signals. U.S. Pat. No. 3,680,099 issued to Elvin E. Herman and Henry F. McCord and U.S. Pat. No. 3,372,389 issued to B. M. Bellman, et al reveal the current state of the art of such analog radar systems. Introduction to Radar Systems, M. I. Skolnick, McGraw Hill Publishing Co., (1962) pp. 118–119, also depicts a system of this type. The analog techniques utilized in prior art systems for measuring and correcting the phase relationships are limited in accuracy by circuit drift and noise considerations. In U.S. Pat. No. 3,680,099, the correction is accomplished in the Intermediate Frequency (IF) portion of the receiver. In U.S. Pat. No. 3,372,389, the output of the system is doppler velocity only, the amplitude of the return signal not being presented. The system described in Introduction to Radar Systems, supra, p. 118, uses a "Coho" (coherent oscillator) which must be locked or synchronized by an IF locking pulse which is related in turn to the phase relationship between the transmitted pulse and a "STALO" (stabilized local oscillator). The phase correction is accomplished at the Intermediate or Radio Frequency. The phase locking accuracy degrades as the transmitted pulse width decreases, rendering the analog techniques unuseable in most short pulse radar applications.

These coherent-on-receive systems have been used in Moving Target Indicating Radar to provide the necessary coherence where no fixed background or clutter signal is available to provide a phase reference from pulse to pulse. They have also been used where the system output requirement is for a doppler signal indicating velocity of a moving target or the relative velocity of a fixed target. The latter case is typified in a high resolution synthetic array radar such as a side looking radar where the zero doppler component output may be used to indicate that the target is 90 degrees to the track of the radar carrying vehicle. Thus, if the doppler component of the target return is filtered in a suitable low pass or matched filter, the effective beam width of the radar antenna may be reduced, thus greatly enchancing the resolution of the system. It will be appreciated, then, that the systems described in the prior art and subsequently described herein are applicable to mobile vehicle mounted synthetic array radar systems and to moving target indicator radars whether fixed or mobile.

SUMMARY OF THE INVENTION

Because of the inherent noise, narrow pulse width, and instability limitations of analog techniques for storage of phase data, it will be understood that the present invention incorporates the use of digital techniques for storage and for phase correction processing of the received signals in order to overcome these limitations and thereby provide a higher degree of accuracy in storage and correction of the phase relationships of a radar system.

It is an object of the invention to accomplish digital storage of the phase relationship between the transmitted pulse and a stable local oscillator in the form of a complex digital number.

It is another object of the invention to accomplish correction of the phase of the received video signals by first converting the video signals to a series of complex digital numbers indicating the amplitude and phase of the received signals with respect to the stable local oscillator and then by operating on these complex digital number signals in a digital data processor with the stored complex digital numbers to provide a new series of digitally corrected complex numbers representing coherent received video signals.

It is a still further object of the invention to reduce circuit complexity by time sharing of the conversion circuits.

These and other aspects of the present invention will become more readily understood from the following detailed description of one embodiment of the invention in conjunction with the accompanying drawing in which.

DETAILED DESCRIPTION OF THE INVENTION

Figure 1:
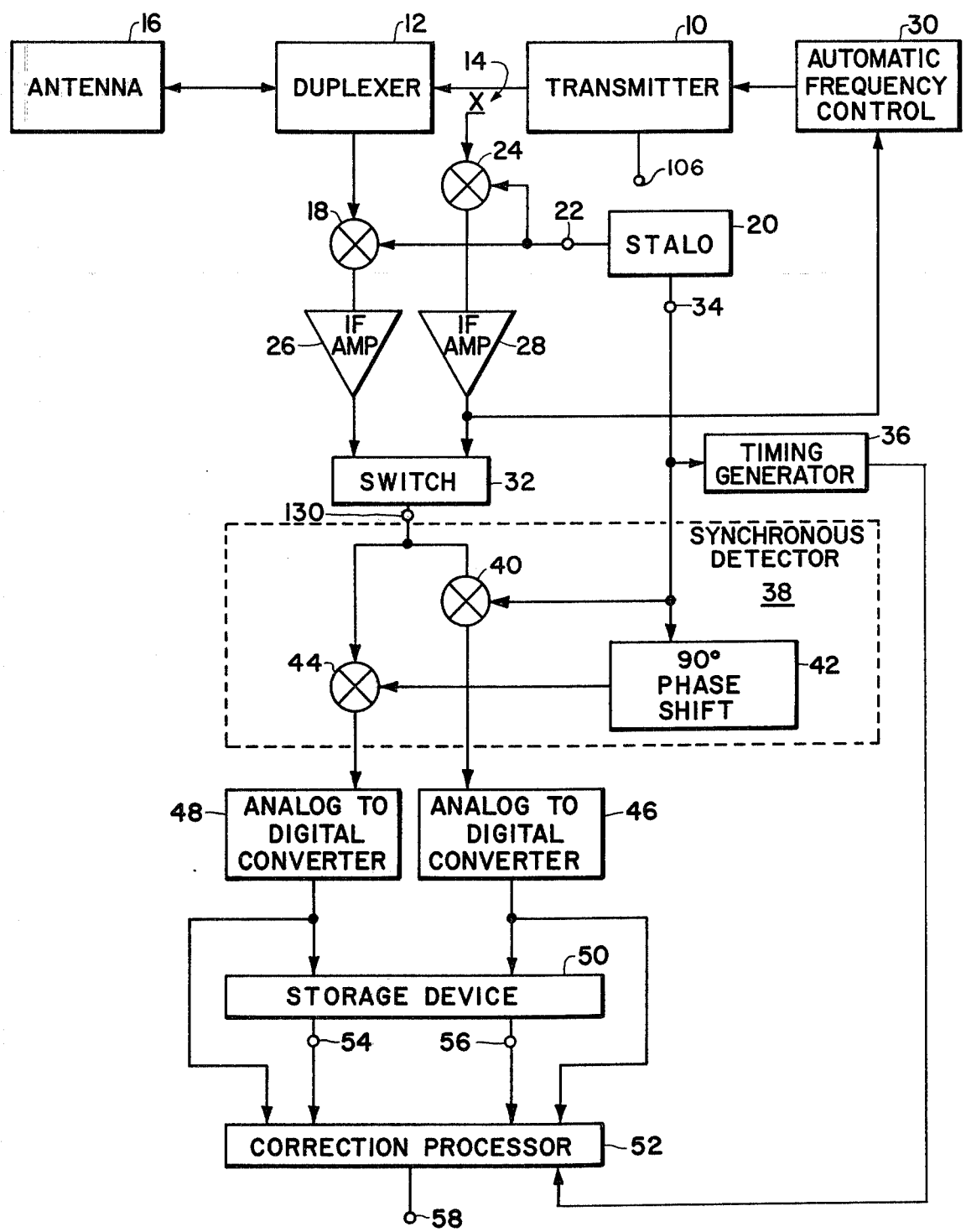
FIG. 1 shows a block diagram of a radar system employing the concept of the present invention.

FIG. 1 shows in block diagram form a radar system utilizing the invention. Transmitter 10 may be of the pulsed magnatron type. The output of transmitter 10 is fed to one input of duplexer 12. A small portion of transmitter 10 pulse power is sampled by coupler 14 located between transmitter 10 and duplexer 12. Duplexer 12 directs the power from transmitter 10 to antenna 16 which is utilized to illuminate a target, not shown. Reflections from this target are received by antenna 16 and fed back to duplexer 12. Duplexer 12 operates to send this reflected signal to signal mixer 18 and to isolate it from transmitter 10. Mixer 18 is also fed by stable local oscillator (STALO) 20. The output from STALO 20 at terminal 22 is the nominal transmitter frequency plus or minus the intermediate frequency amplifier frequency which is predetermined. AFC mixer 24 is fed from directional coupler 14 and from terminal 22 of STALO 20. It is readily seen then that the outputs of signal mixer 18 and AFC mixer 24 are at the IF frequency. Signal mixer 18 feeds IF amplifier 26 and AFC mixer 24 feeds IF amplifier 28. IF amplifier 28 feeds automatic frequency control 30. Automatic frequency control 30 is used to control the frequency of transmitter 10. IF amplifier 28 also feeds switch 32. Switch 32 selects the output of IF amplifier 28 during the period of time that transmitter 10 is being pulsed. During the interpulse time, switch 32 selects the output of IF amplifier 26. STALO 20 is stabilized by a crystal controlled oscillator. STALO 20 includes divider circuits which provide an IF frequency source at terminal 34. Terminal 34 is connected to timing generator 36 and to synchronous detector 38. Synchronous detector 38 is made up of mixers 40, 44 and 90° phase shifter 42. Within synchronous detector 38 terminal 34 is connected to mixer 40 and to 90° phase shifter 42. The output of 90° phase shifter 42 is connected to mixer 44. The output of switch 32 feeds synchronous detector 38 mixers 40, 44. The output of mixer 40 is the in-phase component of the video signal which is fed to Analog to Digital (A to D) converter 46. The output of mixer 44 is the quadrature component of the video signal which is fed to A to D converter 48. The outputs of the two A to D converters 46, 48 contain the complex digital number which identifies the phase and amplitude of the video signal. This complex digital number is fed to storage device 50. The output of storage device 50 is fed by way of terminals 54, 56 to correction processor 52. A second pair of inputs to correction processor 52 are fed from A to D converters 46, 48. The output from correction processor 52 is available on terminal 58 for further usage.

Figures 2, 3:
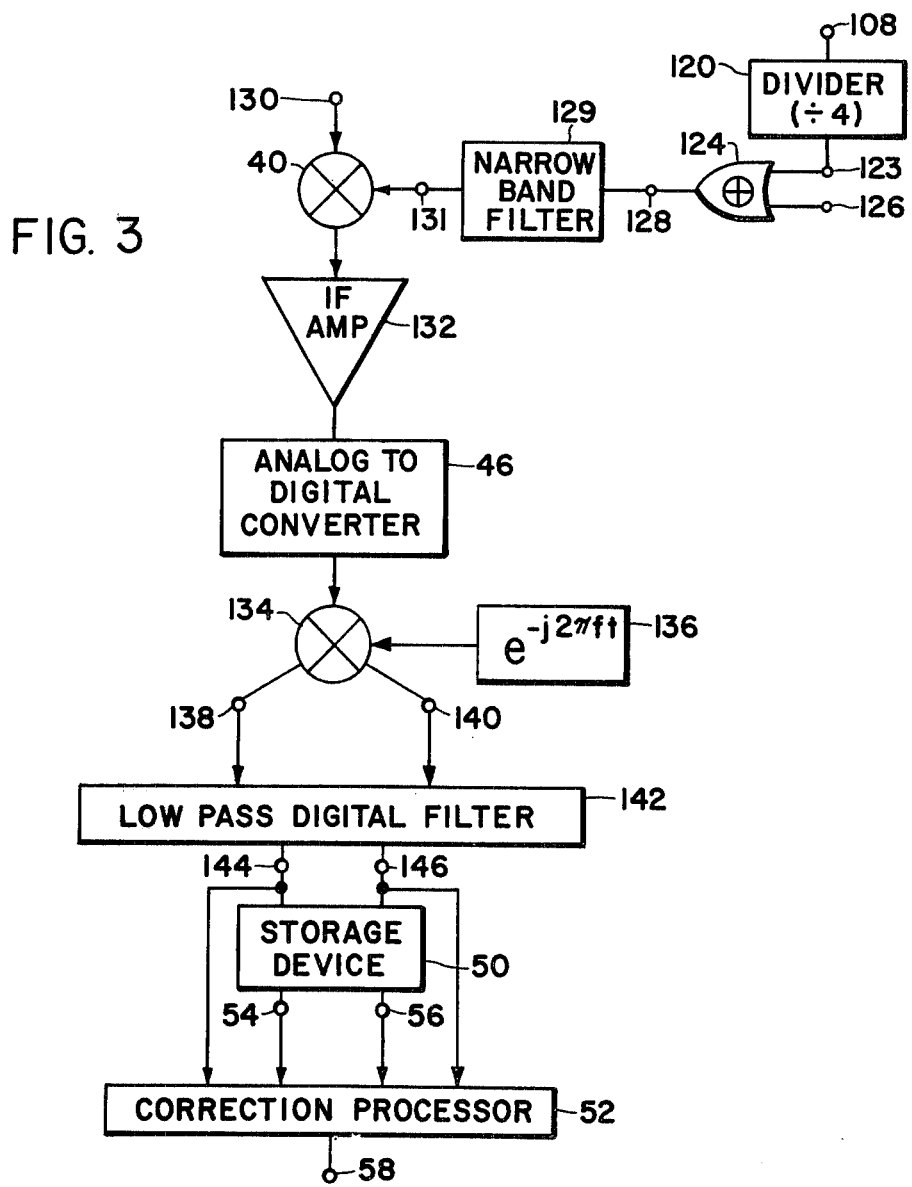
FIG. 2 is a more detailed block diagram of timing generator 36 of FIG. 1.
FIG. 3 shows a block diagram of an alternate circuit to a portion of that of FIG. 1.

FIG. 3 illustrates the block diagram of an alternative embodiment of the invention. (Where the reference numerals of FIG. 1 and FIG. 3 are the same, the described circuit block is also the same.) The alternative circuit is the same as that of FIG. 1 except that mixers 40, 44, A to D converters 46, 48, 90 degree phase shifter 42, storage device 50 and correction processor 52 are replaced with the circuit of FIG. 3 in which:

Mixer 40 is fed from terminal 130 (FIG. 1) and terminal 128. IF amplifier 132 is fed from an output of mixer 40. IF amplifier 132 may have a center frequency of 2.3 MHz. A to D converter 46 is fed from IF amplifier 132. The output of A to D converter 46 is fed to multiplier 134. Multiplier 134 is also fed from $e^{-j2\pi ft}$ generator 136. Time t is quantized by the sampling frequency, fs, to become $t = I\Delta t$ where I is an increasing integer and $\Delta t = 1/fs$. Proper choice of $f$ to be one-fourth of fs results in $e^{-j2\pi ft}$ becoming $e^{-j\pi 2 I/I}$ where $\pi/2$ I advances in 90 degree steps. The multiplier 134 may then simply multiply the data by zero or plus or minus one. Multiplier 134 has two outputs at terminals 138, 140. Output terminals 138, 140 feed low pass digital filter 142. Low pass digital filter 142 has two outputs on terminals 144, 146. Output terminal 144 feeds storage device 50 and correction processor 52. Output terminal 146 feeds another input to storage device 50 and another input to correction processor 52. Correction processor 52 has output terminal 58 as in FIG. 1. The description of the circuit feeding terminal 128 and, hence, mixer 40, will be described subsequently in the description of timing generator 36 (FIG. 1).

Following is the functional description of the invention: Transmitter 10 which is typically a noncoherent pulsed type magnatron is frequency controlled by the AFC loop comprising directional coupler 14, mixer 24, STALO 20, IF amplifier 28 and automatic frequency control 30. This loop is utilized in a well known manner to stablize the frequency of transmitter 10. The frequency output from STALO 20 at terminal 22 is either above or below transmitter 10 frequency by a difference frequency equal to that of the center frequency of IF amplifier 28. Automatic frequency control 30 senses the IF frequency from IF amplifier 28 and utilizes a predetermined IF frequency to sense transmitter frequency variation and to correct it. Duplexer 12 is utilized in a conventional manner to provide an automatic switch to direct transmitter 10 output energy to antenna 16 and at the same time to isolate signal mixer 18 from the transmitted power. Directional coupler 14 may act to prevent received energy from reaching mixer 24. Return signals from the target are picked up by antenna 16 and are fed to duplexer 12. Duplexer 12 acts to channel these return signals to signal mixer 18 and to prevent their transmission back to transmitter 10. The other output to signal mixer 18 is from terminal 22 of STALO 20. The output of signal mixer 18 is at the system intermediate frequency and is fed to IF amplifier 26. As has been explained above switch 32 is used to select output of IF amplifier 28 or of IF amplifier 26 depending on the presence or absence of transmission from transmitter 10. When transmitter 10 is pulsed, switch 32 connects the output of IF amplifier 28 to synchronous detector 38. The signal from switch 32 is fed to mixer 40 which produces the in-phase component of the video signal and to mixer 44 which produces the quadrature phase of the video signal. This is accomplished because terminal 34 output of STALO 20 is an IF frequency reference signal which is fed to the second input of mixer 40 and to 90° phase shifter 42. The output of 90° phase shifter 42 is fed to the second input of mixer 44. The effect of the 90° phase shift is to provide the in-phase component of the video signal at the output of mixer 40 and the quadrature component of the video signal at the output of mixer 44. The in-phase component of the video signal from mixer 40 is fed to A to D converter 46 where it is converted to the real part of a complex digital number. The quadrature video signal from mixer 44 is fed to A to D converter 48 where it is converted to a digital number representing the imaginary part of the complex digital number. So it may be seen that the outputs of A to D converters 46, 48 comprise a dual input to storage device 50 which comprise a complex digital number representing the phase shift representation of transmitter 10 with respect to STALO 20. When the pulse of transmitter 10 is completed, switch 32 selects the output of IF amplifier 26 which is in the return signal channel of the system. In a manner similar to that described for the pulsed output of transmitter 10, synchronous detector 38 converts the IF signal from IF amplifier 26 through switch 32 to a series of complex digital numbers representing the real and imaginary parts of the return signal. In this case, however the signals from A to D converters 46, 48 bypass storage device 50 and are fed directly to correction processor 52 in real time. The outputs of A to D converters 46, 48 are fed to either storage device 50 or correction processor 52 under control of correction processor 52. The connections are omitted for clarity in reading the drawings. Control processor 52 timing signals are derived from timing control 36. Correction processor 52 utilizes the outputs from storage device 50 at terminals 54, 56 to correct the phase of the real time complex digital signals from A to D converters 46, 48 representing the return signal. The corrected composite digital signals are available in real time at terminal 58 for further usage in the system.

FIG. 2 illustrates in more detail, timing control 36 of FIG. 1. STALO 20 of FIG. 1 is also shown in FIG. 2 for clarity. STALO 20 has two outputs on terminals 22, 34. Output terminal 22 is the local oscillator output which is higher or lower than transmitter 10 frequency by a value equal to the center frequency of IF amplifiers 26, 28. This center frequency may be, for example, 60 MHz. The other output of STALO 20 on output terminal 34 will be equal to or nearly equal to the IF amplifier center frequency. Where the circuit of FIG. 1 is used, the signal on terminal 34 will be equal to the nominal center IF amplifier 26, 28 frequency. Where the circuit of the alternative embodiment of FIG. 3 is used, output terminal 34 signal frequency is not fed directly to mixer 40, but is processed further as will be shown subsequently.

The IF signal on output terminal 34 is fed to divider 100 and to mixer 40 (FIG. 1). (The connections to mixer 40 are as described elsewhere in this description.) Divider 100 may divide by 13 the input frequency from terminal 34. The output of divider 100 feeds phase lock loop multiplier 102 which acts as a multiplier; the multiplication may be by a factor of 2. The output of phase lock loop multiplier 102 is fed to terminal 108 and to divider 104. Divider 104 may operate to divide the input frequency by a factor of 12,312. The output of divider 104 is fed to terminal 106 and is further utilized to supply the pulse repetition rate (PRR) for transmitter 10 (see FIG. 1).

Terminal 108, fed from phase lock loop multiplier 102 provides the digital system clock requirements in A to D converters 46, 48, storage device 50 and correction processor 52. (The connections are not shown in the interest of clarity.)

In the alternative circuit of FIG. 3, mixer 40 must be fed from a higher frequency signal source than the IF signal at terminal 34, FIG. 1. The signal from terminal 108, FIG. 2 is connected to divider 120, FIG. 3 input. Divider 120 may divide the input signal by a factor of 4. The frequency divided signal from divider 120 is fed to terminal 122 of exclusive OR gate 124. Input terminal 126 of exclusive OR gate 124 is fed from the IF signal at terminal 34, FIG. 1 (or FIG. 2). Output signal of exclusive OR gate 124 is presented at terminal 128 and hence to narrow band filter 129. Output signal of exclusive OR gate 124 is presented at terminal 131 and hence to mixer 40.

In operation, divider ($\div 13$) 100 and phase lock loop multiplier ($\times 2$) 102 (FIG. 2) act, in combination, to divide the signal from STALO 20, terminal 34 by a factor of 6.5. This means that the IF reference signal frequency from terminal 34, which may be 60 MHz, is divided down by the factor 6.5 to provide a system clock signal frequency of 60 MHz $\div$ 6.5 = 9.23076920 MHz (approximate) on terminal 108.

Divider ($\div$12,312) 104 further reduces the signal frequency by the factor 12,312 to provide a transmitter PRR of 749.73 Hz. (approximate) on terminal 106. (The connection from terminal 106 to transmitter 10, FIG. 1, is omitted for clarity in the drawings.) It will be apparent to one skilled in the art that other dividing and multiplying factors may be used to provide other system clock and PRR frequencies. The timing system shown in FIG. 2 provides a synchronized set of timing signals for synchronous detector 38, receiver mixers 18, 24, transmitter 10 PRR and the system clock used in the digital circuits and A to D converters. This synchronization acts to reduce greatly the amount of system noise due to jitter between the timing signals.

In the alternate embodiment of the invention shown in FIG. 3, the output signal from terminal 108 (FIG. 2) is fed to divider 120 were it is divided by a factor of 4. The output of divider 120 is fed to terminal 123, one input of exclusive OR gate 124. Input terminal 126, the other input to exclusive OR gate 124, is fed from terminal 34 (FIG. 1), the IF reference signal from STALO 20. The signal from terminal 108 (FIG. 2) may have the value 9.23076920 (approximate) as before mentioned. Divider ($\div$4) 120 reduces the input signal on terminal 108 to 2.30769230 MHz (approximately) and applies it to input terminal 123 of exclusive OR gate 124. The other input terminal 126 of exclusive OR gate 124 is fed from the IF reference signal from STALO 20 terminal 34 which may have a frequency of 60 MHz. The output of exclusive OR gate 124 appears on terminal 128 and given the inputs to terminals 123, 126 will have a value of 60 MHz $\pm$ 2.3 MHz (rounded). This output of exclusive OR gate 124 is filtered in narrow band filter 129 to eliminate the 57.7 MHz frequency and pass the 62.3 MHz frequency to terminal 131. This output of narrow band filter 129 is mixed in mixer 40 with the signals from switch 32 (FIG. 1) at terminal 130 input of mixer 40. The output of mixer 40 then has a center frequency of 2.3 MHz, the difference between the two inputs at terminals 128, 130. This center frequency is chosen to be one-half the bandwidth of the system video signal. Thus, the output video spectrum from mixer 40 extends between the frequencies 0 to 4.6 MHz. The signal is amplified in IF amplifier 132 which has a bandwidth of 4.6 MHz centered at 2.3 MHz. A to D converter 46 makes two conversions per input sample from IF amplifier 132. The spacing between samples is one-half the transmitted pulse width. Each digital output from A to D converter 46 is fed to multiplier 134 where it is multiplied by the factor $e^{-j2\pi f t}$ from generator 136. The value of f is equal to one half the bandwidth (4.6 MHz) of the video signal; 2.3 MHz in this embodiment of the invention. Alternate digital outputs of multiplier 134 thus supply the real and imaginary parts (respectively) of the samples made by A to D converter 46.

Low pass digital filter 142 accepts the real part of each sample on terminal 138 and the imaginary part of each sample on terminal 140. Filter 142 eliminates the higher frequency components of the signals caused by aliasing in multiplier 134. The real and imaginary parts of the filtered digital numbers are presented (respectively) on terminals 144, 146 of filter 142. The remainder of the diagram of FIG. 3 is identical to that of FIG. 1 and functions in an identical manner, as has been described above.

The conversions performed in A to D converters 46, 48 begin at the minimum required radar range and are performed at intervals approximately equal to the transmitter pulse width out to the maximum range of interest. The signal from every range interval must be corrected by the phase angle measured between STALO 20 and the noncoherent transmitter 10 pulse for each transmitted pulse. To explain the phase correction function the in-phase and quadrature components of the transmitter sample will be referred to as $I_o$ and $Q_o$ respectively. Similarly, the uncorrected in-phase and quadrature components of the signal received from the range interval I will be labeled $I_i$ and $Q_i$. The corrected video components $L_{ic}$ and $Q_{ic}$ are then calculated by a vector multiplication:

$$I_{ic} + jQ_{ic} = (I_o + jQ_o)(I_i + jQ_i)\sqrt{I_o^2 + Q_o^2}$$

A new correction factor is measured for each transmitter pulse and must be applied to the signals from every range interval in the succeeding interpulse period. After correction, the signals from each range interval will be coherent as defined earlier. Subsequent processing, such as synthetic array or moving target detection, may then be performed in the same manner as for any other type of coherent transmitter/receiver function.

As is evident from FIG. 1, the AFC and the signal channel mixers and IF amplifiers are very similar. As a result, in certain applications, the transmitter leakage through the duplexer into the signal mixer can constitute a sufficient sample to perform the AFC and coherence correction function thereby yielding an even greater system simplification.

In summary, the in-phase and quadrature components which define the phase angle vector of the transmitter RF pulse relative to the STALO are converted to complex digital form and used to correct the echo signal phase while preserving the amplitude to achieve coherence. The digital storage of the correction is simple, accurate and allows time sharing of the circuitry via a switch; that is, the A to D converters already provided for in the signal channel are time shared. In some applications, it will be possible to time share the IF amplifier and mixer also and reduce system complexity even further.

Various modifications and changes may be made to the present invention from the principles of the invention as described above without departing from the spirit and scope thereof, as encompassed in the accompanying claims.

What is claimed is:

1. In a pulsed radar system wherein coherence is achieved in the receiver of the radar system by applying a stored complex digital number, representing the phase relationship between each transmitted pulse and a stable reference oscillator signal, as a correction factor to a series of complex digital numbers, representing the phase relationships between subsequent samples of the received signal and the stable reference oscillator signal, the improvement comprising:

means for digitizing the phase relationship of each transmitted pulse with respect to the reference oscillator signal and for digitizing the phase relationships between the received signals and the reference signal; and means for digitally multiplying said digitized phase relationships by the factor $e^{-j2\pi ft}$, where $f$ is equal to one half the video bandwidth of the radar system, to provide real and imaginary parts of digital complex numbers representing said phase relationships.

2. The improvement according to claim 1 wherein said digitizing means comprises a single analog to digital converter.

3. The improvement according to claim 1 wherein said multiplying means comprises a low pass digital filter for eliminating high frequency spectral components due to aliasing in said multiplying means.

4. The improvement according to claim 1 wherein said digitizing means produces two sequential digital outputs for each sample input, said first digital output representing a real part of the phase relationship and said second digital output representing an imaginary part of the phase relationship.

5. In a coherent-on-receive radar system, an improved method of converting the phase relationship between each transmitted pulse and a stable reference oscillator signal and between subsequentially sampled received signals and the stable reference oscillator signal to complex digital number form, comprising the steps of:

digitizing the phase relationships of the signals sequentially in a single analog to digital converter; and multiplying the digitized signals by the factor $e^{-j2\pi ft}$, where f is equal to one-half the video bandwidth of the radar system, to provide a real and an imaginary complex number.

6. The improved method according to claim 5 wherein the digitizing step is accomplished two times for each input sample.

* * * * *